(12) United States Patent
Ackermann

(10) Patent No.: US 7,369,029 B2
(45) Date of Patent: May 6, 2008

(54) WIRELESS COMMUNICATION FUSE STATE INDICATOR SYSTEM AND METHOD

(75) Inventor: John Marvin Ackermann, Belleville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 10/828,048

(22) Filed: Apr. 20, 2004

(65) Prior Publication Data

US 2005/0231320 A1   Oct. 20, 2005

(51) Int. Cl.
*H01H 85/30* (2006.01)
*G08B 21/00* (2006.01)

(52) U.S. Cl. ............... 337/206; 337/241; 337/265; 340/638

(58) Field of Classification Search ............ 337/1–416; 439/488–491; 116/207; 340/638, 639, 3.43, 340/10.1, 10.4, 572.1
See application file for complete search history.

(56) References Cited

U.S. PATENT DOCUMENTS

| | | | |
|---|---|---|---|
| 809,978 A * | 1/1906 | Ogle ........................... 337/243 |
| 3,218,413 A * | 11/1965 | Koch ........................... 337/197 |
| 3,662,369 A * | 5/1972 | Vinsani et al. ............... 340/638 |
| 4,081,853 A | 3/1978 | Wickson |
| 4,263,589 A | 4/1981 | Lewiner et al. |
| 4,281,322 A * | 7/1981 | Nasu et al. .................. 340/638 |
| 4,349,813 A | 9/1982 | Ishibashi et al. |
| 4,554,607 A | 11/1985 | Mora |
| 4,556,874 A | 12/1985 | Becker |
| 4,616,207 A * | 10/1986 | Knapp et al. ............. 338/32 H |
| 4,635,044 A | 1/1987 | South |
| 4,635,045 A | 1/1987 | Miller et al. |
| H248 H | 4/1987 | Middlebrooks |
| 4,661,807 A | 4/1987 | Panaro |
| 4,691,197 A | 9/1987 | Damiano et al. |
| 4,837,520 A | 6/1989 | Golke et al. |
| 4,875,232 A | 10/1989 | Shumway |
| 4,952,915 A | 8/1990 | Jenkins et al. |
| 5,093,657 A | 3/1992 | Bishop et al. |
| 5,121,318 A | 6/1992 | Lipner et al. |
| 5,182,547 A | 1/1993 | Griffith |
| 5,233,330 A | 8/1993 | Hase |
| 5,247,454 A | 9/1993 | Farrington et al. |
| 5,291,139 A | 3/1994 | Fruhauf et al. |
| 5,343,192 A | 8/1994 | Yenisey |
| 5,347,418 A | 9/1994 | Ando et al. |
| 5,378,931 A | 1/1995 | Bolda et al. |
| 5,404,049 A | 4/1995 | Canada et al. |
| 5,418,515 A * | 5/1995 | Reyes ......................... 337/206 |
| 5,561,580 A | 10/1996 | Pounds et al. |

(Continued)

FOREIGN PATENT DOCUMENTS

EP   1258838   11/2002

(Continued)

*Primary Examiner*—Anatoly Vortman
*Assistant Examiner*—Bradley H Thomas
(74) *Attorney, Agent, or Firm*—King & Spalding LLP

(57) ABSTRACT

An electrical fuse and method therefor includes a protective body, terminal elements extending from said protective body, and a primary fuse element extending within said protective body and electrically connected between the terminal elements, and an identification element configured to transmit a wireless signal to a remote device for determining an operational state of said primary fuse element.

19 Claims, 1 Drawing Sheet

U.S. PATENT DOCUMENTS

| | | |
|---|---|---|
| 5,585,554 A | 12/1996 | Handfield et al. |
| 5,731,760 A | 3/1998 | Ramirez |
| 5,859,596 A | 1/1999 | McRae |
| RE36,317 E | 9/1999 | Arratia |
| 5,973,418 A | 10/1999 | Ciesielka et al. |
| 6,025,783 A | 2/2000 | Steffens, Jr. |
| 6,104,302 A | 8/2000 | Vuong |
| 6,192,325 B1 | 2/2001 | Peity et al. |
| 6,271,759 B1 | 8/2001 | Weinbach et al. |
| 6,366,208 B1 | 4/2002 | Hopkins et al. |
| 6,434,715 B1 | 8/2002 | Andersen |
| 6,549,137 B1 | 4/2003 | Bruchmann |
| 6,566,996 B1 | 5/2003 | Douglass et al. |
| 6,597,179 B2 | 7/2003 | St-Germain |
| 6,624,638 B2 | 9/2003 | St-Germain |
| 6,633,475 B2 | 10/2003 | Thiele |
| 6,691,064 B2 | 2/2004 | Vroman |
| 6,696,969 B2 | 2/2004 | Torrez et al. |
| 6,720,866 B1 * | 4/2004 | Sorrells et al. ............. 340/10.4 |
| 6,745,151 B2 | 6/2004 | Marko et al. |
| 6,757,714 B1 | 6/2004 | Hansen |
| 6,806,808 B1 * | 10/2004 | Watters et al. ........... 340/10.41 |
| 6,825,771 B2 | 11/2004 | Bruno et al. |
| 6,839,597 B2 | 1/2005 | Hattori et al. |
| 6,859,131 B2 | 2/2005 | Stanek et al. |
| 6,892,107 B2 | 5/2005 | Baba et al. |
| 6,895,368 B2 | 5/2005 | Murakami |
| 7,034,660 B2 * | 4/2006 | Watters et al. ........... 340/10.41 |
| 2002/0021226 A1 | 2/2002 | Clement et al. |
| 2002/0158776 A1 * | 10/2002 | Lash et al. .................. 340/984 |
| 2005/0017908 A1 | 1/2005 | Saegrov |
| 2005/0024218 A1 | 2/2005 | Cuk |

FOREIGN PATENT DOCUMENTS

| | | |
|---|---|---|
| WO | WO 99/05761 | 4/1999 |

* cited by examiner

WIRELESS COMMUNICATION FUSE STATE INDICATOR SYSTEM AND METHOD

BACKGROUND OF THE INVENTION

This invention relates generally to fuses, and more particularly to fuses having fuse state indicators.

Fuses are widely used overcurrent protection devices having a primary fusible link or primary fuse element assembly extending between conductive terminal elements, such as end caps or blade terminals. When the terminal elements are electrically connected to an energized electrical circuit, current flows through the primary fusible link or fuse element assembly. The primary fusible link or fuse element assembly is designed to physically melt, disintegrate, or otherwise structurally fail when the current flowing through the fuse reaches a predetermined level, thereby opening the electrical circuit through the fuse and protecting associated electrical equipment and components from damage. Once the fusible link has opened the circuit, the fuse may be removed and replaced with another fuse to once again complete the circuit.

Identifying open fuses for replacement is not always an easy endeavor, especially in larger electrical systems employing a large number of fuses. To assist in locating opened fuses in a more efficient manner, various types of fuse state indicators have been developed which may be used to indicate an operative state of the fuse. Known indicators, for example, provide local fuse state identification features built into a housing of the fuse, such as lamps, light emitting diodes, temperature responsive materials, mechanical pins and flags which indicate opened fuses via a change in appearance of the fuse. Such indicators, however, are disadvantaged in several aspects.

For example, mechanical indicators have been developed including spring loaded elements which are released when the primary fuse element opens. Such mechanical indicators, however, can be difficult to assemble and may not be as reliable as desired.

Other types of fuse state indicators indicate an operative state of the fuse by a physical transformation in the appearance of a fuse. Typically, this entails a conductive indicator link assembly extending on an exterior surface of the body of the fuse. The external link forms a secondary fuse link external to the body of the fuse and is connected in parallel with the primary fuse element within the body of the fuse. Either the indicator link itself or other portions of the indicator assembly changes color when the indicator link opens in an overcurrent condition. These types of indicators, however, have proven difficult to reliably terminate the external indicator links to the terminal elements of the fuse.

Further, some known fuses include alarm terminals which may signal an external device (e.g., a computer or a relay) of an opened fuse. Such remote fuse state indication, however, entails a hard wired point-to-point connection between the fuse alarm terminal and the external device. Many fused systems are not wired for this purpose.

Regardless of the type of indicator used, manufacturing limitations tend to produce some variability in result or effect when fuses open, and such variability may make it difficult to locate opened fuses despite the indicators. For example, one fuse may exhibit an obvious change in appearance when the primary fuse element opens while another fuse may exhibit only a slight change when the primary fuse element is opened. The slight change may not be evident to personnel expecting to see the obvious change.

Additionally, a considerable period of time may elapse before a given fuse opens, and the lapse of time may decrease the likelihood that the indicator will operate properly. This is particularly the case for mechanically actuated indicating systems, fuse state indicators including lamps and illuminators, and fuse state indicators including temperature responsive materials which may degrade over time.

Still further, fuses having known indicators must typically be installed in a particular orientation in an electrical system so that the indicator is visible for inspection. If the fuse has to be removed from an electrical system to inspect the indicator, the value of the indicator is lost. Also, if a fuse is improperly installed, which may not be evident from a visual inspection of the fuse, current may not flow properly through the fuse and the indicator will not function as it was designed. In such circumstances, known indicators are ineffective to identify a problem fuse.

BRIEF DESCRIPTION OF THE INVENTION

According to an exemplary embodiment, an electrical fuse comprises a protective body, terminal elements extending from the protective body, a primary fuse element extending within the protective body and electrically connected between the terminal elements, and an identification element configured to transmit a wireless signal to a remote device for determining an operational state of said primary fuse element.

According to another exemplary embodiment, a fuse state identification system is provided. The system comprises at least one fuse comprising a protective body, terminal elements coupled to the protective body, a primary fuse element extending within the protective body and electrically connected between the terminal elements, and an identification element located between said terminal elements. A remote communicating device is configured to communicate with the identification element through an air interface.

In yet another exemplary embodiment, a fuse state indication system comprises a radio frequency identification tag comprising a transmitter, wherein the tag is electrically connected to a fuse comprising a primary fuse element, and a radio frequency interrogation device configured to transmit wireless communication with the tag for determination of an operative state of the fuse.

In still another embodiment a method for indicating an opened fuse in a fused system having at least one fuse with a fuse state identification element therein and a communication device remote from the fuse is provided. The method comprises transmitting a signal to the identification element of the fuse with the communication device through an air interface, awaiting a response from the identification element to the communication device, and determining the operational state of the fuse based upon the response or lack thereof from the identification element.

DETAILED DESCRIPTION OF THE INVENTION

Figure 1:
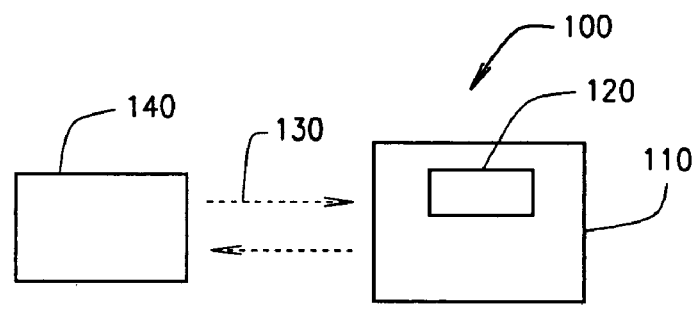
FIG. 1 is schematic block diagram of an exemplary embodiment of a fuse state identification system.

FIG. 1 is a schematic block diagram of an exemplary embodiment of a fuse state identification system 100 including a fuse 110 having an identification element or tag device 120 coupled thereto which communicates, via a wireless connection 130, with a remote device 140 such as a reader or interrogator device described below. The identification element 120 is electrically connected to the fuse 110 and may be used to determine whether the fuse 110 is in an operational state (i.e., a current carrying or unopened condition completing an electrical connection through the fuse), or whether the fuse 110 is in a non-operational state (i.e., an opened condition breaking the electrical connection through the fuse).

As explained below, signal transmission from the identification element 120 to the communicating device 140 may reliably indicate the operating state of the fuse 110 on demand. Signal transmission from the identification element 120 to the communicating device 140 is conducted through an air interface and point-to-point wiring is avoided. The system 100 may therefore be used universally with existing fused systems without retrofitting or modification thereof with wires or signal conductors to connect the fuse to the communication device.

Still further, the system 100 may communicate, in addition to the opened or unopened state of the fuse, other information of interest regarding the fused system. In particular, the system 100 may be used to identify improperly installed or malfunctioning fuses, as well as to provide information pertaining to the electrical system associated with the fuse 110. The system 100 is implemented electronically and avoids degradation issues from the passage of time, and may be implemented in a cost effective manner.

In an exemplary embodiment, the communicating device 140 and the identification element 120 communicate via radio frequency and the system operates in accordance with known radio frequency identification (RFID) systems. As such, and as those in the art may appreciate, the identification element 120 is an RFID identification tag and the communicating device 140 is an RFID reader or an interrogator. Thus, the system operates on close proximity electromagnetic or inductive coupling of the identification element 120 and the communicating device 140, or alternatively operates using propagating electromagnetic waves. It is contemplated, however, that other forms and types of wireless communication may be utilized in lieu of RFID communication, including but not limited to infrared communication, without departing from the scope and spirit of the invention.

Figure 2:
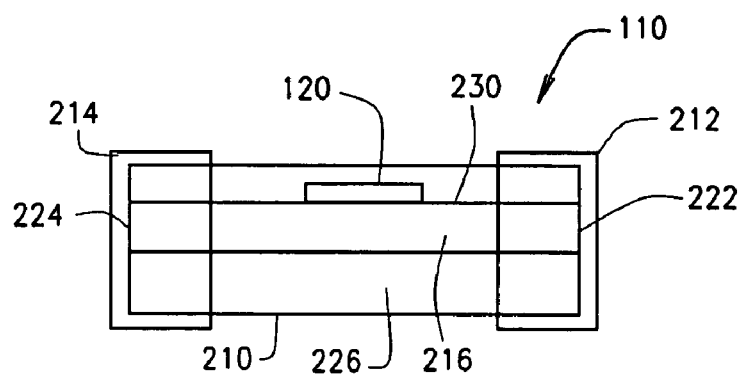
FIG. 2 is a cross sectional schematic view of an exemplary embodiment of a fuse for the fuse state identification system shown in FIG. 1.

FIG. 2 is a cross sectional schematic view of an exemplary embodiment of the fuse 110 for use in the system 100 (shown in FIG. 1). In accordance with known fuses, the fuse 110 includes a protective body 210 fabricated from an insulative (i.e., non-conductive) material, conductive terminal elements 212, 214 coupled to the body 210, and a primary fuse element 216 extending within the body 210 and electrically connected between the terminal elements 212, 214. The primary fuse element 216 is constructed, sized, and dimensioned to melt, disintegrate, vaporize, or otherwise structurally fail upon the occurrence of a predetermined current condition (i.e., a fault current) to break or open the electrical connection through the fuse 110 between the terminal elements 212, 214. Opening of the primary fuse link 216 in such a manner protects electrical components and equipment associated with the fuse 110 from damage which may otherwise result from the fault current. Various types of fuse elements and assemblies are known for accomplishing this objective, and the invention is not limited to any particular type or configuration of the primary fuse element.

In an illustrative embodiment, the fuse 110 is a cylindrical cartridge fuse including a cylindrical body 210 having a first end 222, a second end 224, and a bore 226 extending therebetween. The primary fuse element 216 extends through the bore 226 and is connected to the terminal elements 212 and 214 in a known manner, e.g., via soldering to the terminal elements 212 and 214 or via conductive washers (not shown) which engage the elements 212, 214. In one embodiment, the terminal elements 212, 214 are conductive ferrules or end caps and are attached to the respective ends 222, 224 of the body 210 in a known manner, such as with crimping techniques. When the terminal elements 212, 214 are connected to line-side and load-side electrical circuitry (not shown) a current path is formed through the primary fuse element 216. While a cylindrical or tubular body 210 is illustrated in FIG. 2, it is understood that other shapes and configurations of bodies or housings may be employed in alternative embodiments, including but not limited to rectangular fuse modules. Likewise, a variety of terminal elements may be used in lieu of the end caps 212 and 214 without departing from the scope and spirit of the invention.

The identification element 120 is electrically connected in parallel with the primary fuse element 216 and is interior to the fuse body 210, although it is understood that in an alternative embodiment, the identification element 120 may be located on an outer surface of the body 210. In the illustrated embodiment, the identification element 120 is connected to the terminal elements 212, 214 in a known manner through a fine fuse wire or other conductive material having a much greater electrical resistance than the primary fuse element 216. As such, only a very small portion of the current flowing through the fuse 110 flows through the identification element 120, and the identification element 120 may therefore monitor a relatively small current to indicate the state of the fuse 110 as described below.

In an exemplary embodiment, the identification element 120 is a known RFID transponder device which communicates wirelessly with the communication device 140 (shown in FIG. 1) via an air interface over a predetermined radio frequency carrier, for example, 100-500 kHz, and more particularly, at about 125 kHz. It is understood, however, that other frequency carriers may be employed per applicable RFID standards. Also, it is recognized that data transmission rates between the identification element 120 and the communication device 140 are impacted by the selected carrier frequency for signal transmission. That is, the higher the frequency, the higher the transmission rate between the devices.

The operating range or distance of communication between the communication device 140 and the identification element 120 is dependent upon the power level of the devices, which may be, for example from 100-500 mW or as dictated by applicable regulations. The range is principally affected by the power available at the communication device 140 to communicate with the identification element 120, the power available within the identification element 120 to respond, and environmental conditions and the presence of structures in the operating environment. In one embodiment the power level of the identification element 120 is much less than the power level of the communication device 140. It is believed that those of ordinary skill in the art would be able to select appropriate power levels to meet desired specifications and objectives for a particular operating environment without further explanation.

Figure 3:
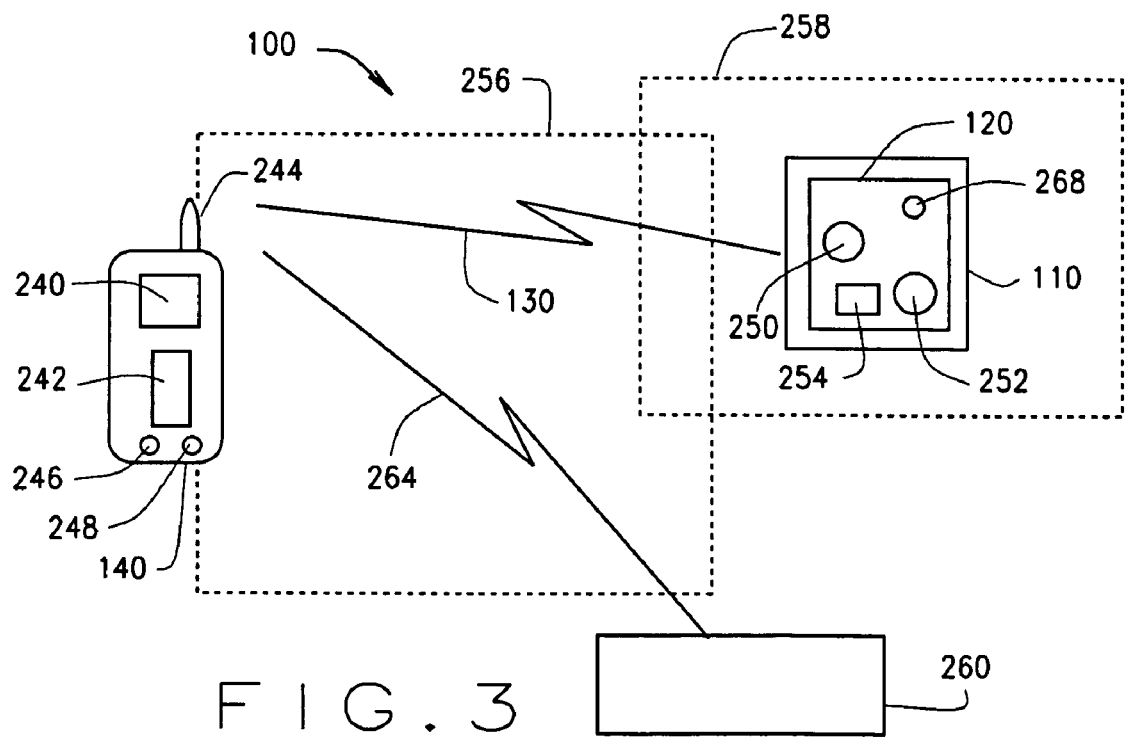
FIG. 3 is a schematic view of the fuse state identification system shown in FIG. 1 in more detail.

Referring now to FIG. 3, in an exemplary embodiment, the communication device 140 includes a display 240, an interface 242, an antenna 244, and optionally includes a processor 246 and a memory 248. The operation of the communication device 140 is described in some detail below.

The identification element 120 of the fuse 110 includes a processor 250, an antenna 252, and a memory 254, which in various embodiments may be read-only memory (ROM), random access memory (RAM), or non-volatile programming memory, such as electrically erasable programmable memory (EEPROM), depending on the sophistication of the element 120. The processor 250 communicates, via radio frequency by a wireless connection 130 (shown in FIG. 1), with the communication device 140 when interrogated by the communication device 140, and the antenna 252 senses a field generated by the communication device 140 in operation. The antenna 252 also serves to transmit a response to the communication device 140 in a known manner.

As explained below, the operational state of the fuse 110 may be determined by a response, or lack of response, from the identification element 120 to an interrogation by the device 140. The communication device 140 may be used to test and diagnose the operational state of a number of fuses 110 without disconnecting the fuses 110 from the associated circuitry. On demand by a user, the device 140 interrogates the identification element 120 via wireless communication (e.g., radio frequency communication) over an air interface such that a transmission field 256 of the communication device antenna 244 interacts with a transmission field 258 of the identification element antenna 252. In response to the interrogation, the identification element 120 answers the device 140. Depending upon the sophistication of the communication protocol and the relation of the identification element to the primary fuse link 216 of the fuse 110, the operational state of the fuse 110 may be determined in a variety of ways by the processor based identification element 120.

In an exemplary embodiment, the identification element 120 is a passive radio frequency transmitter, and relies upon a transmission field generated by the communication device 140 for power to respond to the device 140. In such an embodiment, the identification element 120 does not store data relating to the operational state of the fuse 110.

In an alternative embodiment, the identification element 120 is an active radio frequency transponder, and is powered by an onboard power supply, such as a battery 268, or alternatively, is powered by the electrical current passing through the secondary fuse link 230 (shown in FIG. 2). As such, the identification element 120 is capable of storing data and transmitting the data to the communication device 140 when interrogated. That is, in such an embodiment the identification element 120 is a read and write device and is capable of advanced functions, such as problem diagnosis and troubleshooting.

The processor based communication device 140 may be programmed to interpret responses to interrogations and provide an output to a user in a readable form as described below.

For example, in one embodiment any signal received from the identification element 120 in response to an interrogation by the communication device 140 may be taken as an indication that the primary fuse element 216 (shown in FIG. 2) is operational. For example, considering the fuse 110 shown in FIG. 2, when the primary fuse link 216 opens the entire fault current would be directed to the identification element 120, and if the identification element 120 is selected so that the fault current destroys or renders the element 120 inoperable, the element 120 could not function to respond after the fuse 110 has opened. Thus, if no response is received from a given identification element 120, it may be presumed that the associated fuse has opened.

Similarly, in another embodiment the identification element 120 could be merely physically located in proximity to the primary fuse element 216 without being electrically connected to the terminal elements 212 and 214 or the primary fuse element 216. In such an embodiment, heat and electrical arcing associated with opening of the primary fuse element 216 would damage the identification element 120 and prevent it from responding to an interrogation. Thus, if no response is received from a given identification element 120, it may be presumed that the associated fuse has opened.

As another example, through strategic selection of the identification element 120 and with strategic connection of the identification element 120 to the fuse 110, the identification element 120 may withstand opening of the primary fuse element 216 and determine the opening of the primary fuse element 216 via, for example, current or voltage sensing of the electrical circuit through the fuse 110. In such an embodiment, the identification element 120 may respond in a first manner when the fuse 110 is in an operational state and respond in a second manner different from the first when the fuse 110 is in a non-operational state.

When used in a scanning motion past a number of fuses 110, the communication device 140 may interrogate the identification elements 120 of the fuses 110 and determine, based upon the type of responses received, which, if any, of the fuses 110 are inoperative.

In a more advanced communications protocol, a response from an identification element 120 may be decoded by the device 140, thereby allowing communication of specific data stored in the identification element 120 to be communicated to the communication device 140. For example, one or more of an identification code, a location code, a manufacturing date, etc. and even data pertaining to current characteristics over time may be stored in the memory 254 of the identification element 120. Thus, the system 100 could be of aid in troubleshooting an electrical system. Improperly installed fuses or malfunctioning fuses, may likewise be detected and diagnosed with appropriate programming of the identification element 120 and the communication device 140.

In one embodiment, response information transmitted from the identification elements 120 of fuses 110 may be displayed directly to a user via the display 240 in a hand held device 140, therefore providing real time feedback regarding the state of the fuse or fuses in the vicinity of the communication device 140 which have been interrogated. In a further and/or alternative embodiment, the processor 246 of the device 140 processes and compiles data and information relating to the state of fuses as interrogations are made and as replies are received, and the data and information is then stored in the memory 248 of the device 140. Such data and information stored in the memory 248 may be downloaded to an information management system, or host computer, 260 using a communication link 264, such as, for example, the internet or other network connection, a wireless connection (e.g., radio frequency), an optical communication link, etc. as those in the art will appreciate. The information management system 260 processes and stores the information and data for evaluation by a user for analysis. Any fuses 110 which are opened and require replacement may be identified, together with other data of interest regarding the fused system. Improperly installed fuses or malfunctioning units, may likewise be detected and diagnosed with appropriate programming of the identification element 120 and the communication device 140.

Data from the information management system 260 may likewise be transferred from the information management system 260 to the communication device 140, and the data may be used, for example, to match responses from selected identification elements 120 with specific fuses 110 in the system.

Also, such data may be used to generate interrogatories to specific fuses 110 of a system. In such an embodiment the identification elements 120 of the fuses 110 may be programmed to ignore certain interrogatories and to respond to other interrogatories from the communication device 140. Further, the identification elements 120 of the fuses 110 may be programmed to respond differently as different interrogatories are made. For example, an identification element 120 may send a very basic response to a basic interrogatory, or a detailed response including supporting data for a more advanced interrogation.

Having now described some exemplary embodiments of the system 100, it is believed that the programming of the system components to achieve desired outputs for monitoring the status of the fuses and the associated fuse system is within the purview of those in the art.

While the invention has been described in terms of various specific embodiments, those skilled in the art will recognize that the invention can be practiced with modification within the spirit and scope of the claims.

What is claimed is:

1. A fuse state indication system comprising:
    an overcurrent protection fuse comprising a primary fuse element extending between terminal elements, said terminal elements configured for removable connection to line-side and load-side electrical circuitry and said terminal elements completing a current path through said primary fuse element, the current path of the primary fuse element failing upon a predetermined current failing upon a predetermined current flowing through the primary fuse element;
    a radio frequency identification tag comprising a transmitter, wherein said tag is coupled to said fuse; and
    a radio frequency interrogation device configured to wirelessly communicate with said tag to determine whether said fuse is in a current carrying state via operation of said transmitter or whether said fuse is an opened state breaking an electrical connection through said primary fuse element between said terminal elements via non-operation of said transmitter, thereby identifying opened fuses for replacement.

2. A fuse state indication system according to claim 1, wherein the identification tag is electrically connected to the terminal elements of the fuse.

3. A fuse state indication system according to claim 1, wherein the identification tag is physically located in proximity to said primary fuse element, wherein heat and electrical arcing associated with opening of the primary fuse element damages the identification tag to prevent transmission of a signal from the identification tag.

4. A method for indicating an opened fuse in a fused system having at least one overcurrent protection fuse with a fuse state identification element and a communication device remote from the fuse, said method comprising:

transmitting a signal to the identification element of the fuse with the communication device through an air interface;
    awaiting a response from the identification element to the communication device; and
    determining the operational current carrying state of the overcurrent protection fuse based upon the response or lack thereof from the identification element, wherein a response from the identification element is taken as an indication that the primary fuse element is in an operational current-carrying state, and further wherein a lack of response is taken as an indication that the primary fuse element is in an opened non-current carrying state.

5. A method in accordance with claim 4 further comprising:
    generating a transmission field with the communication device; and
    powering the identification element with the transmission field.

6. A method in accordance with claim 4 wherein transmitting a signal comprises transmitting a radio frequency signal.

7. A method in accordance with claim 4, further comprising electrically connecting the identification element in parallel with the primary fuse element.

8. A method in accordance with claim 4, further comprising locating the identification element physically proximate to the primary fuse element and subject to damage when the primary fuse element electrically opens, thereby preventing the identification element from responding after the primary fuse element has opened.

9. A method in accordance with claim 4, further comprising strong information and data relating to the operational current carrying state of the overcurrent protection fuse.

10. A method in accordance with claim 4, further comprising decoding at least one of the signal to the identification element and the response from the identification element; the decoded response including data corresponding to the operational current carrying state of the fuse of analysis, wherein the data comprises at least one of a location code for the overcurrent protection fuse, a manufacturing code for the overcurrent protection fuse, a manufacturing date for the overcurrent protection fuse, and data pertaining to voltage characteristics experienced by the overcurrent protection fuse.

11. A method in accordance with claim 4, further comprising:
    selectively transmitting at least first and second signals to the identification element of the fuse with the communication device, the first and second signals being different from one another;
    receiving the selectively transmitted signal with the identification element;
    responding to the selectively transmitted signal with a basic response when the first signal is received; and
    responding to the selectively transmitted signal with a detailed response when the second signal is received;
    wherein the basic response and the detailed response are different from one another.

12. An electrical fuse comprising:
    a protective body;
    terminal elements extending from said protective body;
    a primary fuse element extending within said protective body and electrically connected between said terminal elements, said primary fuse element constructed to fail upon an occurrence of a predetermined current condition, thereby providing overcurrent protection to an electrical circuit completed through said terminal elements; and an identification element coupled to the fuse, the identification element being configured to transmit a radio frequency signal to a remote device when the primary fuse element is in an operational current carrying state, and the identification element being rendered inoperable to transmit a radio frequency signal when the primary fuse element has failed.

13. A fuse according to claim 12, wherein the identification element is electrically connected to terminal elements of the fuse.

14. A fuse according to claim 12, wherein the identification element is physically located in proximity to said primary fuse element, wherein heat and electrical arcing associated with opening of the primary fuse element damages the identification element to prevent transmission of a signal from the identification element.

15. A fuse according to claim 12, wherein the identification element comprises at least one of a transmitter, a responder, and a transponder.

16. A fuse state identification system comprising:

overcurrent protection means for defining a conductive path between first and second terminal elements, the overcurrent protection means responsive to current flow therethrough to open an electrical connection between the terminal elements when a predetermined current condition occurs;

identification means, associated with the overcurrent protection means, for communicating an operational current carrying state of the overcurrent protection means through an air interface, wherein the identification means is physically located in proximity to the overcurrent protection means, wherein heat and electrical arcing associated with opening of the overcurrent protection means damages the identification means to prevent transmission of a signal from the identification means;

communication means, located remotely from the identification means, for communicating with the identification means through an air interface; and determining means, responsive to communication between the identification means and the communication means, for determining the operational current carrying state of the overcurrent protection means as closed to complete the conductive path or opened to interrupt the current path.

17. A fuse state identification system according to claim 16, wherein the identification means is electrically connected to the terminal elements of the overcurrent protection means.

18. A fuse state identification system according to claim 16, wherein the identification means comprises at least one of a transmitter, a responder, and a transponder.

19. A fuse state identification system according to claim 16, wherein the identification means is configured to transmit a radio frequency signal.

* * * * *

UNITED STATES PATENT AND TRADEMARK OFFICE
CERTIFICATE OF CORRECTION

PATENT NO.       : 7,369,029 B2                                      Page 1 of 1
APPLICATION NO.  : 10/828048
DATED            : May 6, 2008
INVENTOR(S)      : Ackermann It is certified that error appears in the above-identified patent and that said Letters Patent is hereby corrected as shown below:

Column 9, line 23, between "identification" and "comprising", insert -- system --.

Signed and Sealed this

Seventeenth Day of March, 2009

JOHN DOLL
*Acting Director of the United States Patent and Trademark Office*